(12) United States Patent
Fang

(10) Patent No.: US 6,476,764 B2
(45) Date of Patent: Nov. 5, 2002

(54) POST-INSTALLATION MONITORING METHOD FOR A SATELLITE TERMINAL ANTENNA

(75) Inventor: Russell Fang, Potomac, MD (US)

(73) Assignee: Hughes Electronics Corporation, El Segundo, CA (US)

(*) Notice: Subject to any disclaimer, the term of this patent is extended or adjusted under 35 U.S.C. 154(b) by 0 days.

(21) Appl. No.: 09/962,836

(22) Filed: Sep. 25, 2001

(65) Prior Publication Data

US 2002/0050953 A1 May 2, 2002

Related U.S. Application Data

(60) Provisional application No. 60/236,839, filed on Sep. 29, 2000.

(51) Int. Cl.$^7$ ................................................ H01Q 3/00
(52) U.S. Cl. ..................................................... 342/359
(58) Field of Search ........................... 342/74, 75, 359; 343/757, 760

(56) References Cited

U.S. PATENT DOCUMENTS

| | | | | |
|---|---|---|---|---|
| 4,030,099 A | * | 6/1977 | Valenti et al. | 343/117 R |
| 5,561,433 A | * | 10/1996 | Chaney et al. | 342/359 |
| 5,592,176 A | * | 1/1997 | Vickers et al. | 342/359 |
| 5,923,288 A | * | 7/1999 | Pedlow | 342/359 |

* cited by examiner

Primary Examiner—Dao Phan
(74) Attorney, Agent, or Firm—John T. Whelan; Michael W. Sales

(57) ABSTRACT

The present invention relates to a system and method for monitoring a non-tracking satellite antenna terminal's pointing accuracy in three situations. First, the pointing accuracy is monitored after initial installation of the antenna within a geo-synchronous satellite communications system. Secondly, the method is employed to determine mispointing of the antenna terminal as a result of a long term event such as building settlement. Lastly, the method is employed to detect mis-pointing of the non-tracking antenna terminal due to a short term event, such as an earthquake, wind storm, or hurricane.

18 Claims, 8 Drawing Sheets

POST-INSTALLATION MONITORING METHOD FOR A SATELLITE TERMINAL ANTENNA

The present invention claims benefit under 35 U.S.C. section 119 (e) of a provisional U.S. Patent application of Russell J. Fang entitled "Method and Apparatus for Satellite Terminal Antenna Pointing and Satellite Terminal Monitoring Techniques", Ser. No. 60/236,839, filed Sep. 29, 2000.

FIELD OF THE INVENTION

The present invention relates generally to a method for monitoring a non-tracking satellite terminal antenna, after initial installation, wherein the terminal operates within a geo-synchronous satellite communications network. More particularly, the present invention relates to detecting mis-pointing of a non-tracking satellite terminal antenna due to antenna mis-pointing upon initial installation, and a long-term event, such as building settlement, as well as a short-term event such as any weather related phenomena, for example earthquakes and wind storms.

BACKGROUND OF THE INVENTION

DETAILED DESCRIPTION OF THE RELATED ART

As shown in FIG. 1, a satellite communications network 100 employs a plurality of satellite terminals 130 comprising antennas 140 to communicate with a satellite 110 as well as a network control center 120. There are various conventional means of installing and pointing the ST 130 which are time-consuming and tedious, as detailed below. Nonetheless, post-installation monitoring of an ST 130 is important to insure proper reception of signals at the ST 130, as well as to reduce the number of costly site revisits by an installer if the initial installation is not successful, or due to short term and long term events that degrade link margin performance between the satellite 110 and the ST 130.

A conventional means of installing a satellite terminal (ST) antenna 130 in a geo-synchronous satellite system 100 can be time-consuming and tedious. The installation requires knowledge of the desired satellite 110 location on the geo-synchronous orbital arc and its elevation and azimuth angles relative to the antenna location. The installer performs an initial search by pointing the antenna toward the direction of the target satellite until sufficient satellite signal power is received to declare successful acquisition of the target satellite. Once the target satellite is acquired, the installer optimizes antenna pointing by peaking the strength of the received signal. The idea is to align the antenna bore-sight directly towards the target satellite. The installer can also employ the method described in a related patent application of Russell J. Fang, entitled "System and Method for Pointing the Bore Sight of a Terminal Antenna towards the Center of a Satellite Station-Keeping Box In the Geo-Synchronous Orbit", filed September 25, 2001, to align the boresight of the antenna to the center of a satellite station keeping box. In any event, the non-tracking antenna is left untouched for operational use, after its installation by any method. Accordingly, a need exists for a post-installation monitoring method that can measure how well the bore sight of the antenna of a ST 130 is aligned relative to the center of the satellite station keeping box, which is the ideal satellite position.

Also, significant antenna mis-pointing can result if the installer attempts to install the antenna under rainy or cloudy conditions or if the installer does not follow the recommended procedure for ST 130 installation as detailed above. In addition, despite an antenna being perfectly pointed, certain events can cause antenna mis-pointing as well. For example, short-term events such as earthquakes, hurricanes, tornados, micro bursts, and other natural events can cause antenna mis-pointing. Also, long term events such as building settlement can cause gradual antenna mis-pointing, and eventually resulting in gross antenna mis-pointing.

A mis-pointed terminal antenna not only causes degradation to the transmission link performance between the satellite 110 and the ST 130, but also can cause undesirable interference to users in an adjacent satellite system. Many times, costly site revisits are necessary, along with customer complaints as a consequence of a mis-pointed antenna. Accordingly, a need exists for a means to monitor the antenna mis-pointing either due to improper installation or due to some special short term or long term events as cited above. A need exists for quickly detecting these mis-pointed antennas and informing the network operations and control center for necessary corrective measures.

SUMMARY OF THE INVENTION

The above described disadvantages are overcome and advantages realized by a method for determining the pointing of a non-tracking satellite terminal antenna as a result of improper installation, or a long term event, such as building settlement, or a short term event such as weather related phenomena. The satellite terminal antenna is adapted to receive a signal from at least one satellite within a communications network. The satellite terminal then identifies a satellite station keeping box in which the satellite is expected to be present, and divides the satellite station keeping box into a plurality of regions. The method comprises determining a plurality of first measurement values, each representing a magnitude of a signal received from the satellite by the satellite terminal antenna when the satellite terminal antenna is pointing towards a first location, corresponding to a substantially central area of the satellite station keeping box. The next step involves determining at least one second measurement value corresponding to a respective one of the satellite position regions and representing a magnitude of a second signal received by the satellite terminal antenna from the satellite. The satellite terminal antenna then compares at least one of the second measurement values to the first measurement value corresponding to the region of the satellite station keeping box to which the second measurement value corresponds. Finally, the ST issues an alarm signal when a result of the comparison indicates that at least one second measurement value differs from the first measurement value by mote than a pre-determined amount.

BRIEF DESCRIPTION OF THE DRAWINGS

These and other aspects, advantages and novel features of the invention will be more readily appreciated from the following detailed description when read in conjunction with the accompanying drawings, in which.

DETAILED DESCRIPTION OF THE PREFERRED EMBODIMENT

Figure 1:
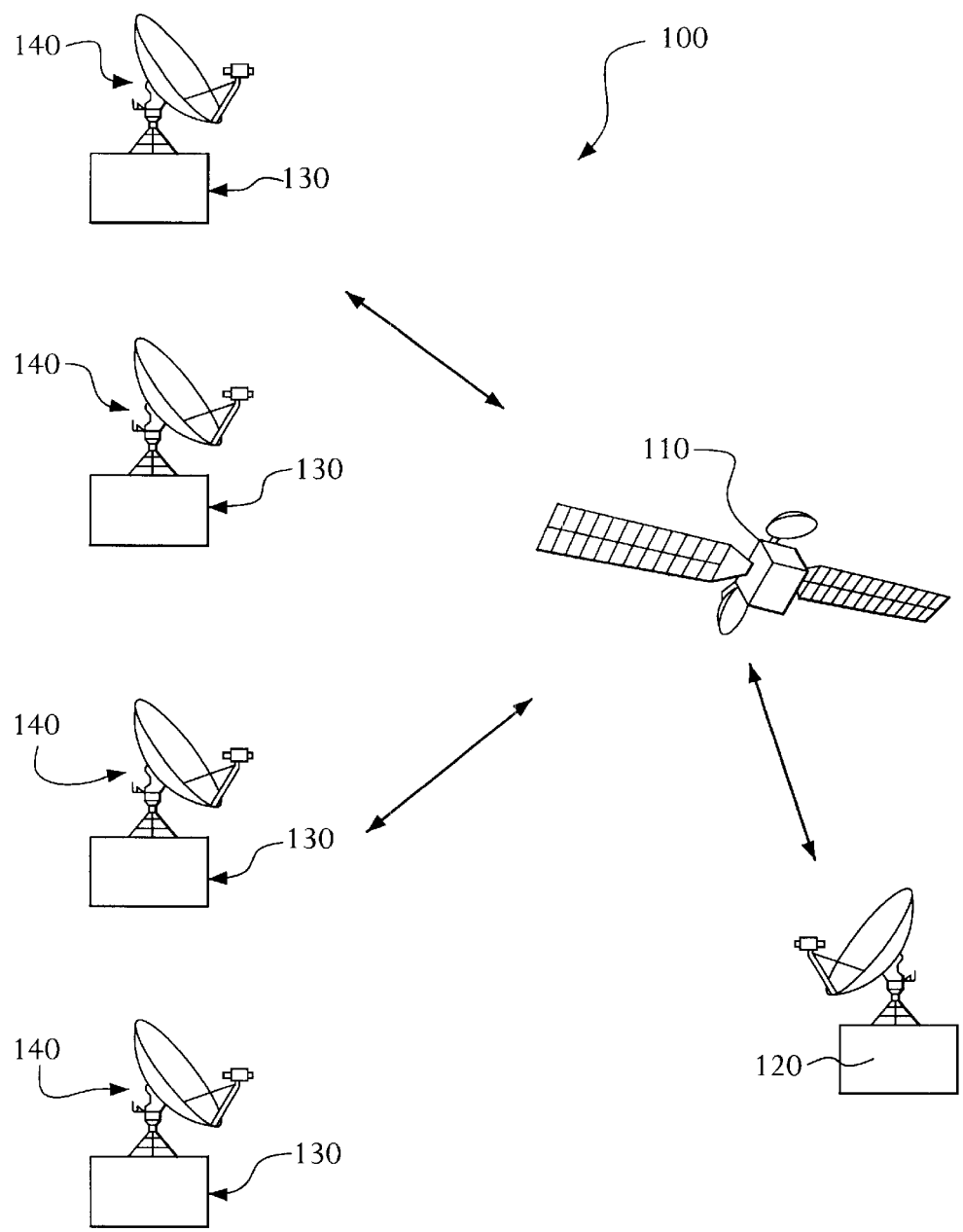
FIG. 1 is a block diagram overview of a satellite-based communication system.

An embodiment of the present invention can be employed in the satellite-based communication system shown in FIG. 1 to correct for ST 130 terminal antenna mis-pointing caused by improper installation, and short or long term events such as those described above. In addition, an embodiment of the present invention can be employed to monitor an ST 130 after initial pointing.

Figure 2:
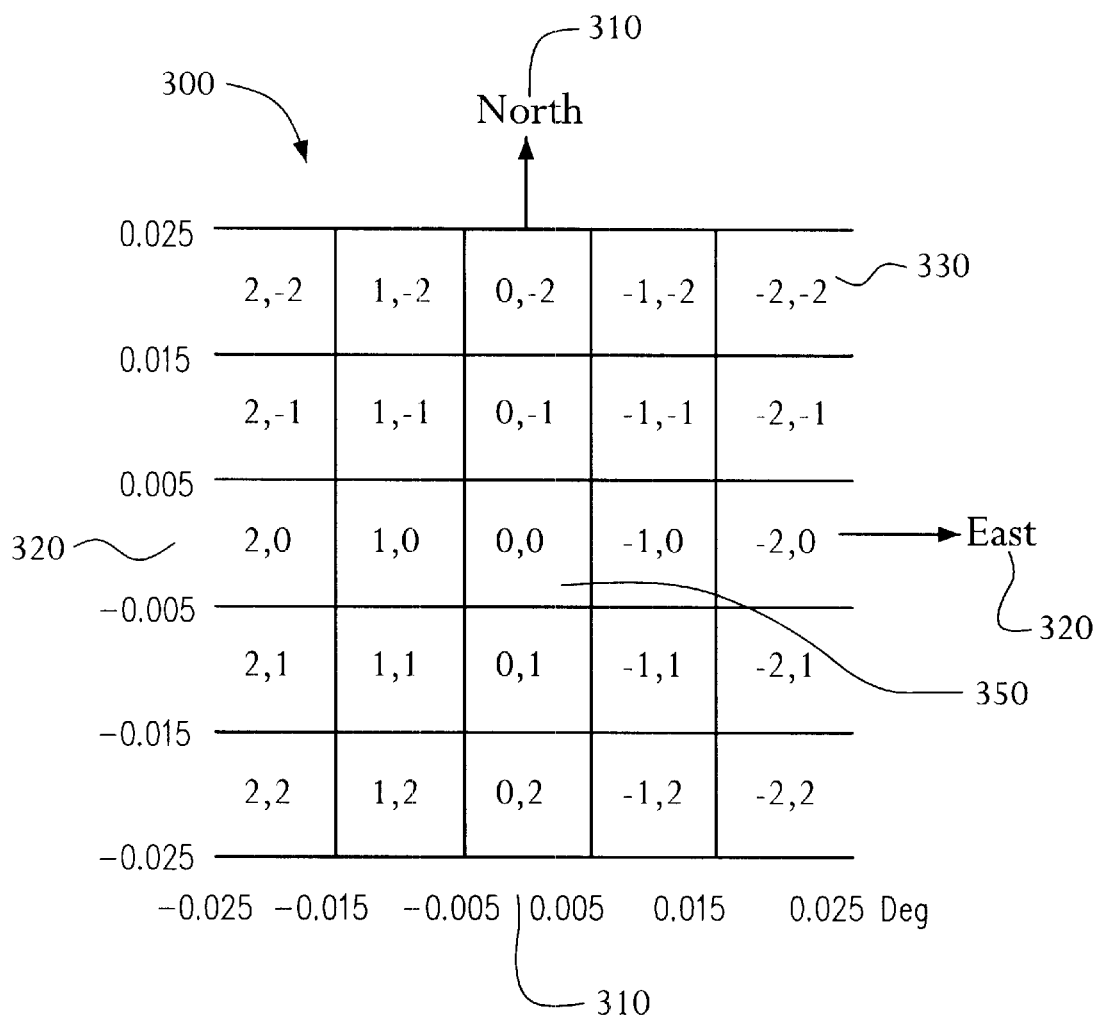
FIG. 2 is a grid representative of a satellite station-keeping box with the corresponding azimuth and elevation errors.

An example of initial ST 130 pointing will now be described. However, it is important to note that the pointing method described below does not necessarily have to be used with the ST 130 monitoring method detailed as an embodiment of the present invention. The pointing method employing a satellite station keeping box, as shown in FIG. 2, is used to point the satellite terminal antenna's bore sight towards the center 350 of the satellite station keeping box 300. FIG. 2 depicts the satellite station keeping box 300 indicating the range of movement that a satellite typically experiences, as illustrated by the outer perimeters 310 and 320 of the satellite station keeping box 300. The allowable range of locations 300 is defined in terms of an angular box as viewed from the earth's center towards the satellite, usually defined in terms of an allowable north-south range 310 and an east-west range 320 centered on the nominal assigned satellite position on the geo-synchronous orbital arc. The box is referred to as a satellite station-keeping box 300.

Figure 3:
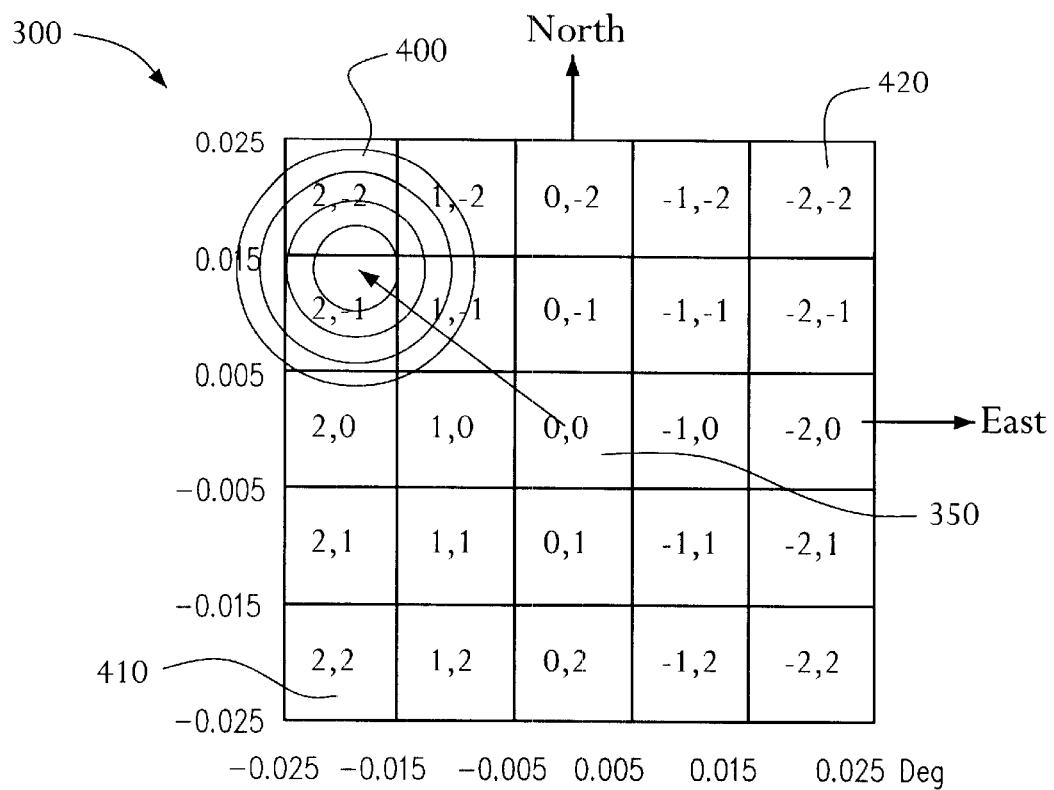
FIG. 3 is illustrative of a circularly symmetric antenna pattern relative to the satellite station-keeping box.

FIG. 3 shows the satellite station keeping box 300 has a circularly symmetric antenna pattern imposed upon it 300 depicting the location of the satellite 110 at a particular moment within the satellite station keeping box 300. Accordingly, the non-tracking antenna 140 is continually pointed towards the center 350 of the satellite station keeping box 300, if the installer aligns the antenna bore sight towards the box center during terminal installation. By maintaining the ST 130 at this central position, the largest excursion between the antenna's bore sight and the actual satellite 110 position at any moment is no greater than half the diagonal of the satellite station-keeping box 300. On the other hand, if the installer aligns the antenna bore sight towards the actual satellite position at the terminal installation time, (which could be at the corner of the box), then the maximum distance between the antenna bore sight and the satellite position could be as large as the complete diagonal as the satellite moves to the opposite corner of the box at some later time after installation. Accordingly, if the installer aligns the antenna bore sight towards the box center, then despite the movement of the satellite 110 throughout the satellite station-keeping box 300, the maximum distance between the antenna bore sight and the satellite is only one-half the diagonal of the box 300. This allows the satellite terminal to achieve more than acceptable signal reception from the satellite 300.

With continued reference to FIG. 3, the ST 130 quantizes the ±0.025° satellite station-keeping box into $N \times N = N^2$ (e.g., 5×5=25) equal size bins. To achieve acceptable signal reception the satellite terminal antenna bore sight is pointed and aligned with the desired satellite by any conventional method, for example, a bracketing technique. Next, the ST 130 obtains the actual satellite position data from the satellite 110, from which the ST 130 knows the satellite position error in terms of elevation and azimuth angles relative to the box center 350. For each bin 330, a fixed correction error vector in terms of azimuth and elevation angles relative to the box center 350 is computed. The ST 130 applies a correction to its antenna pointing in the direction opposite to the error vector such that the antenna bore sight is pointed at the box center 350 instead of the actual satellite position bin 330. By pointing the ST 130 towards the center bin 350, the ST 130 is at an optimum position within the satellite station-keeping box 300, despite any drift or other forces exerted upon the satellite 110.

Figure 5:
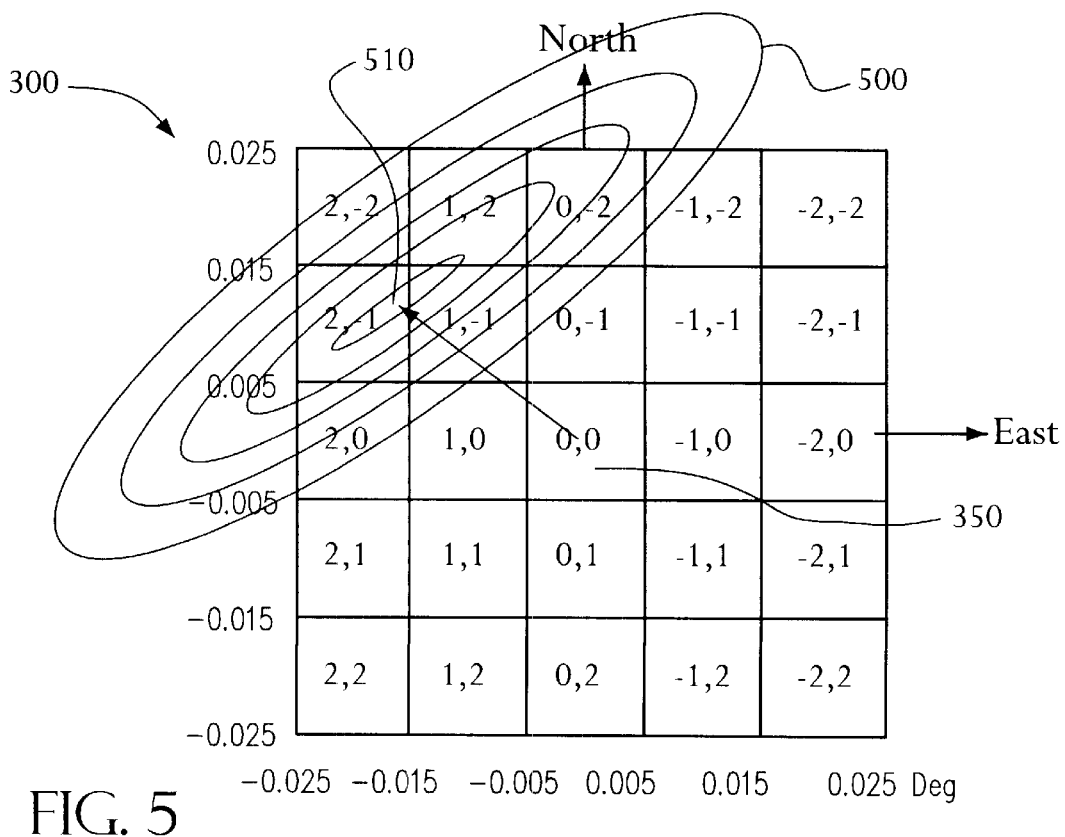
FIG. 5 is illustrative of a non-circularly symmetric antenna pattern relative to the satellite station-keeping box.
Figure 4:
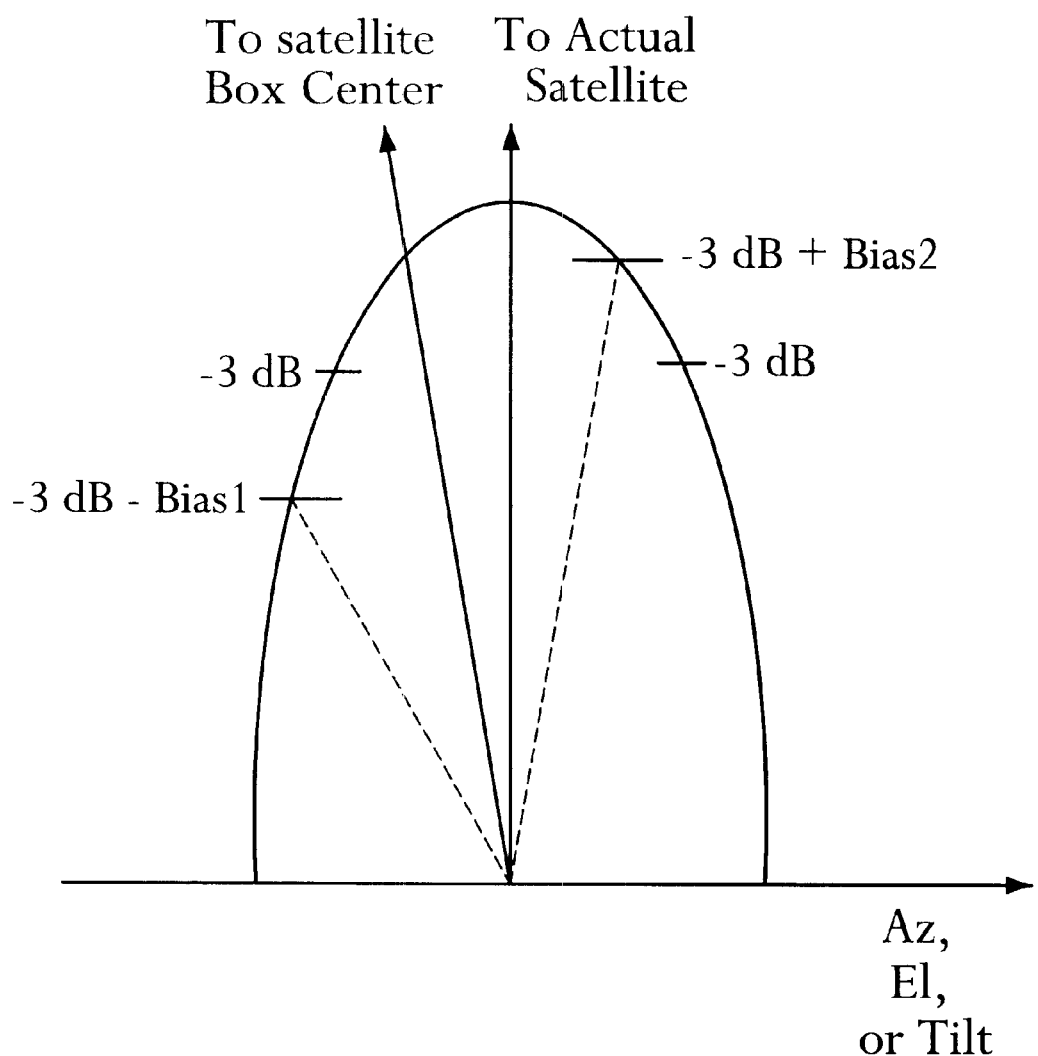
FIG. 4 is an antenna pattern highlighting the bias adjusted 3 dB points of either side of the antenna pattern.

FIG. 4 depicts the signal measurements in relation to azimuth, elevation, and tilt along with bias adjusted signal measurements obtained when the satellite terminal is pointing towards the center 350 of the satellite station keeping box 300. In operation, the ST 130 computes and stores its pattern for antenna-pointing adjustments. The antenna pattern is not necessary if the antenna is circularly symmetric, as shown in FIG. 3, in which case the parabolic shape of gain rolloff is assumed. Next, the antenna 140 is pointed using any conventional means, for example the bracketing technique mentioned above. The ST 130 obtains the satellite 110 position from the satellite 110, from which it knows the satellite position error vector relative to the box center 350 on the basis of the satellite 110 position. On the basis of this error vector, the ST 130 computes the needed biases in dB for azimuth, elevation, and tilt in order to align the antenna to the box center 350 by using the Gaussian receive gain rolloff for a circularly symmetric antenna, as shown in FIG. 3, or the actual gain rolloff for a non-circularly symmetric antenna, as shown in FIG. 5.

The ST 130 computes the needed bias at the −3 dB receiving gain rolloff points with the antenna beam pattern and the angular corrections. Bias1 and Bias2 are the amount of adjustment required to have the antenna pointing towards the center of the satellite station-keeping box. The ST 130 makes very fine tilt angle adjustments in the direction determined from the satellite position error vector and measure the signal to noise ratio values around the two −3 dB gain rolloff points until the two signal to noise ratio values are consistent with the desired biases as in FIG. 4. The ST 130 repeats this process for very fine elevation and azimuth adjustments.

Once the ST 130 is positioned, as detailed above, post-installation monitoring is employed to ensure adequate carrier to noise parameters for acceptable link margin performance between the ST 130 and the satellite 110. An embodiment of the present invention employs post-installation monitoring methods for detecting antenna mis-pointing after initial installation, as well as short term and long term event induced mis-pointing. Additionally, the system and method of the present invention is extendable to the conventional C and Ku band Very Small Aperture Terminal (VSAT) systems. As mentioned above, a short term event is generally considered to be weather related phenomena such as earthquakes, hurricanes, and micro-bursts. This is in contrast to a long term event which includes building settlement, or any other gradual event that induces antenna mis-pointing.

The monitoring method, applicable to all three situations mentioned above, includes establishing a carrier to noise (C/N) measurement reference signal representative of a maximum C/N measurement and the associated satellite position for each of the bins within the satellite station keeping box 300. The first of the three situations comprises detecting antenna mis-pointing after initial ST installation. The method for this situation entails, the ST 130 measuring a beacon C/N, designated as $(C/N)_b$, at suitable intervals, for example every 96 msec., as part of its uplink power control (ULPC) process and which is averaged over a super frame period of 768 msec to ensure accurate reading. The ST 130 acquires the satellite position location via a cell-cast transmission information packet (TIP) from the satellite. Thus, the ST 130 maintains a record of the $(C/N)_b$ readings along with the satellite position location for each of the N ×N bins within the satellite station keeping box 300. As discussed above, the satellite station keeping box 300 is divided into N×N equal-sized bins to assist in this record keeping. In other words, the ST 130 maintains an N×N matrix, each element of which consists of two entries: one for the maximum $(C/N)_b$, and the other for its associated satellite position data. To obtain a reference maximum $(C/N)_b$ for each bin, the ST 130 obtains satellite position data from the cell-cast TIP message. Next, the ST 130 compares the newly measured $(C/N)_b$ with the previously stored absolute Max $(C/N)_b$ in the corresponding bin and saves the newly measured $(C/N)_b$ as the absolute Max $(C/N)_b$ for the corresponding bin, only if the newly measured $(C/N)_b$ is larger than the previously measured absolute Max $(C/N)_b$ for the corresponding bin. The above described steps are repeated for all satellite positions throughout the satellite station-keeping box over a sufficiently long period of time (e.g., one month) depending upon the location of the ST 130. For example, the absolute Max $(C/N)_b$ and the associated satellite position information is obtained in Arizona more quickly than in the Gulf region where there are typically mote rainy days. As mentioned above rain or clouds inhibits the link margin performance between the ST 130 and the satellite 110. Max $(C/N)_b$ are typically available under clear sky conditions, those areas that experience more cloudy and rainy days increase the time frame for obtaining all the required measurements.

Accordingly, over a sufficiently long period of time, for example 1 month, the satellite would have traversed over the entire $N^2$ bins of the satellite station keeping box many times with a large number of clear sky $(C/N)_b$ measurements for each bin. Maximum beacon $(C/N)_b$ readings together with their associated satellite position data can be registered for each of these $N^2$ bins. These maxima would only occur under clear sky conditions, so ample data points are available for these bins.

Figure 6:
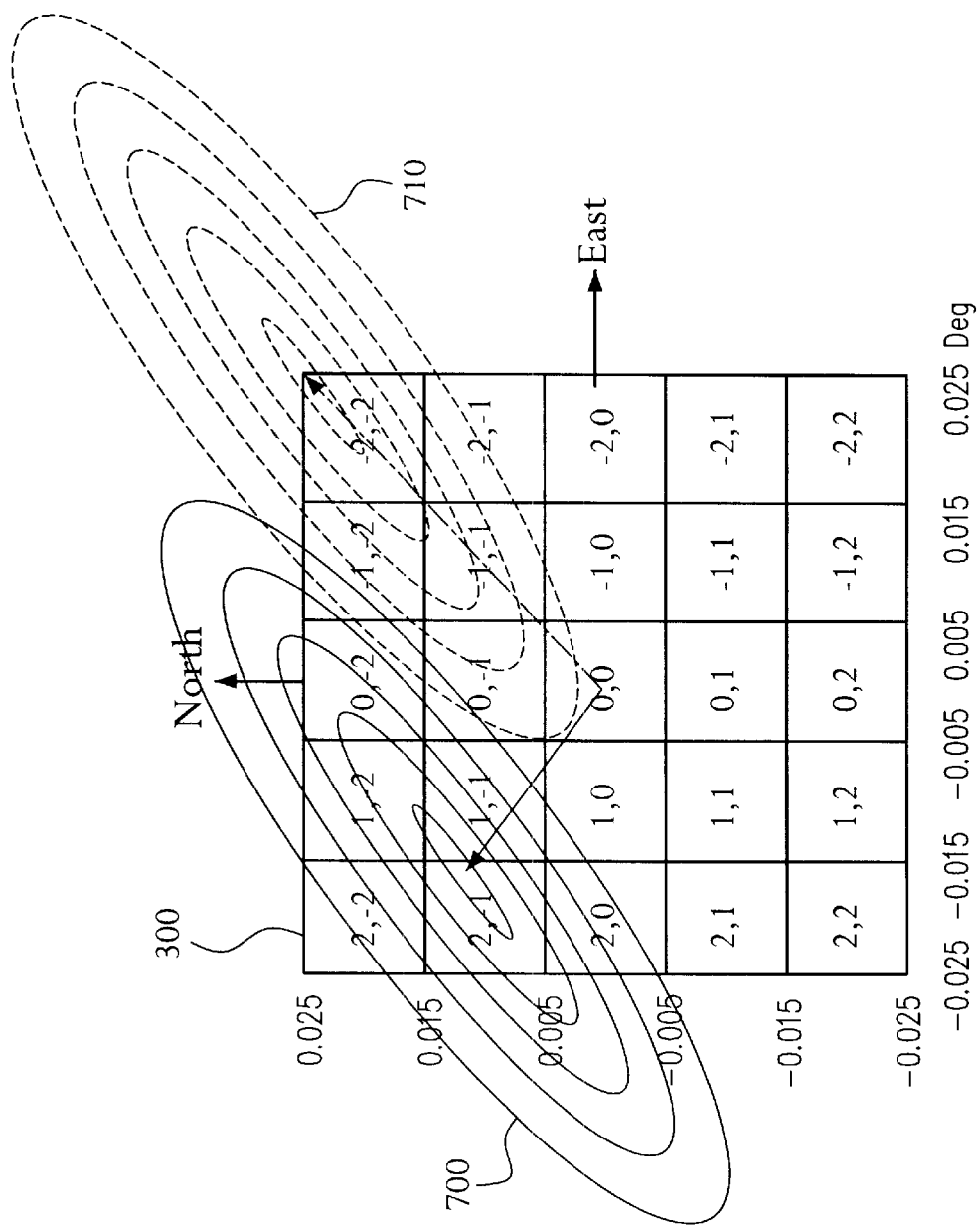
FIG. 6 is an illustration of a satellite station-keeping box with two antenna patterns representing two different pointing directions of the satellite terminal antenna after a long term event induced antenna mis-pointing in accordance with an embodiment of the present invention.

Effectively, these maxima readings would correspond to a sectional cut of the ST antenna pattern as seen in FIG. 6. It is desirable to have a larger portion of the antenna pattern inside the satellite station keeping box 300. Accordingly, anything outside the box is not measurable. The antenna contour 700 represents a properly pointed ST 130. By contrast, the antenna contour 710 represents an antenna pattern for a mis-pointed ST 130 since the bulk of the antenna pattern 710 is outside the satellite station keeping box 300.

On the basis of the antenna contours as seen over these $N^2$ bins, the ST 130 can compute the gradients and estimate the position of its antenna bore-sight. As discussed in more detail below, by comparing the estimated antenna bore-sight and the center of the box, the ST can determine the amount of its antenna mis-pointing. If the peak $(C/N)_b$ is located within the center 5 bins of the satellite station keeping box 300, nothing needs to be done. However, if the peak $(C/N)_b$ is outside those 5 bins an alarm message containing these maximum $(C/N)_b$ readings and their associated satellite position data can be sent to the NOCC 120. On the basis of these alarms, the operator can assess the severity of the mis-pointing and decide whether to schedule a site visit for antenna re-pointing.

Figure 7:
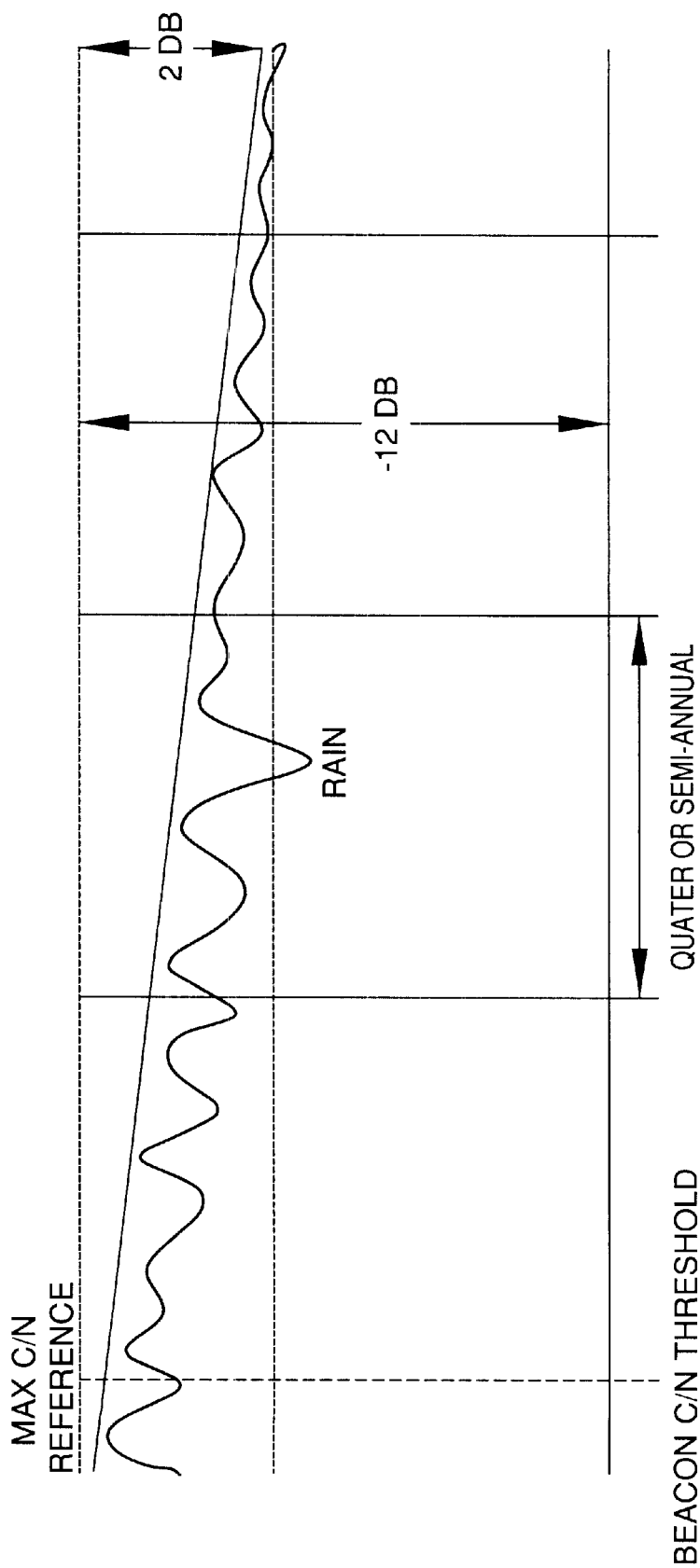
FIG. 7 is a graph depicting the maximum carrier to noise signal in relation to time for detecting long-term event induced antenna mis-pointing.

The second of the three situations mentioned above comprises antenna mis-pointing due to a long term event, such as building settlement. The antenna contour 710 represents an ST 130 that is mis-pointed after a long term event such as building settlement. In addition, FIG. 7 depicts the peak beacon maximum $(C/N)_b$ as a function of time for detecting long- term induced antenna mis-pointing. In other words, the gradual decrease over time in signal degradation as the ST 130 is slowly mis-pointed due to a long term event. For example, once the signal is reduced by 2 db in terms of a power measurement from the maximum $(C/N)_b$ it falls out of the acceptable range for signal reception by the ST 130. The timeframe for the above described mis-pointing is on the order of a couple of years.

The method for detecting antenna mis-pointing as a result of a long-term event entails the following computation at the ST 130. The ST 130 saves the reference maximum beacon $(C/N)_b$ contours and their associated satellite position data at about 1 to 2 months time after the ST initial installation and denotes the absolute maximum value of these max $(C/N)_b$ across all bins as Max C/N(0). The ST 130 then measures the beacon C/N and generates a new set of maximum beacon $(C/N)_b$ contour plots periodically (e.g., quarterly) by using the same process as described above. The new absolute maximum across all bins are presented as Max C/N(i) for this $i^{th}$ set of maximum beacon $(C/N)_b$ contour plots. The ST 130 determines if Max C/N (i)>Max C/N (0), then employs this ith set as the new reference. However, if Max C/N (i) <Max C/N (0), the following computation is performed: Δ=Max C/N (i)–Max C/N (0). The ST 130 determines the maximum acceptable link margin deviation, in this case −2 dB. The acceptable link margin deviation comprises the smallest acceptable signal to noise ratio between the ST 130 and the satellite 110, while the satellite 110 is within the perimeter of the satellite station keeping box 300. Only if Δ<−2 dB, for example, then the ST 130 declares the antenna mispointed and sends an alarm message to the NOCC 120.

The time period for making new sets of measurements is determined on the basis of operational experience and the allowable mis-detection probability. The very nature of long term events allows detection to take place over months rather than days as compared to short term events. The threshold value of acceptable signal reception is a configurable value depending upon the allowable false detection probability as well as antenna size and type.

The last of the three situations comprises antenna mis-pointing due to a short term event generally related to weather. Short term events such as earthquakes, hurricanes, tornados, and micro bursts are fast processes, when compared with the long term event of building settlement. The consequences of these short term events in terms of antenna mis-pointing need to be detected quickly. If the event is so severe that the antenna is blown away or is totally mispointed without the possibility of beacon reception, then the effects of mis-pointing can be easily detected through the NOCC 120. In addition, a short term periodic event such as building sway can cause minimal degradation in terms of added antenna pointing loss, and hence will be ignored. The scope of an embodiment of the present invention covers those short term events, which cause antenna mis-pointing yet still allow for reception of a downlink beacon signal. In other words, the type of mis-pointing detected by the present invention would occur under the condition that the reception by the ST 130 is poor, the link margin is so small that there may be interference into other STs 130.

Figure 8:
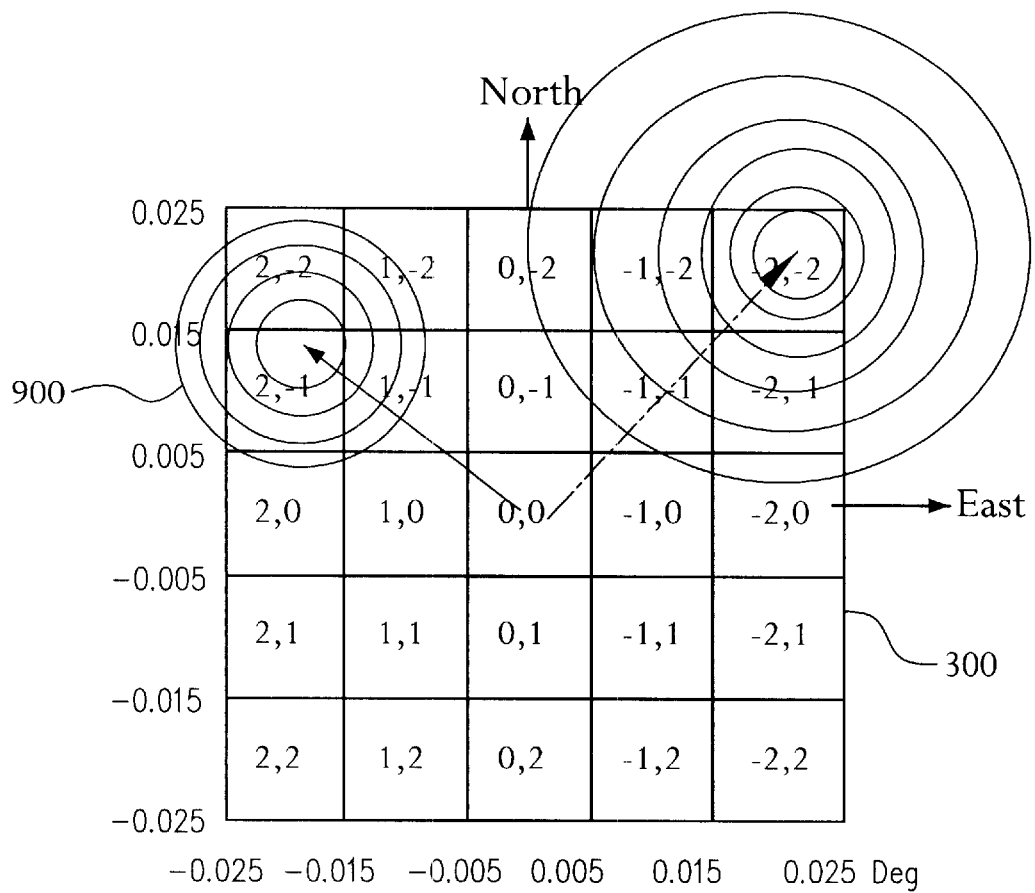
FIG. 8 is an illustration of a satellite station-keeping box with two antenna patterns representing two different pointing directions of the satellite terminal antenna after a short term event inducted antenna mis-pointing in accordance with an embodiment of the present invention.

FIG. 8 depicts two circularly symmetric antenna contours. Antenna contour 900 represents measurements from an acceptably pointed ST 130, whereas antenna contour 910 represents measurements from a mis-pointed ST 130. The bulk of the antenna contour 900 lies within the satellite station keeping box 300. By contrast, the majority of the antenna contour 910 lies outside of the satellite station keeping box 300.

Figure 9:
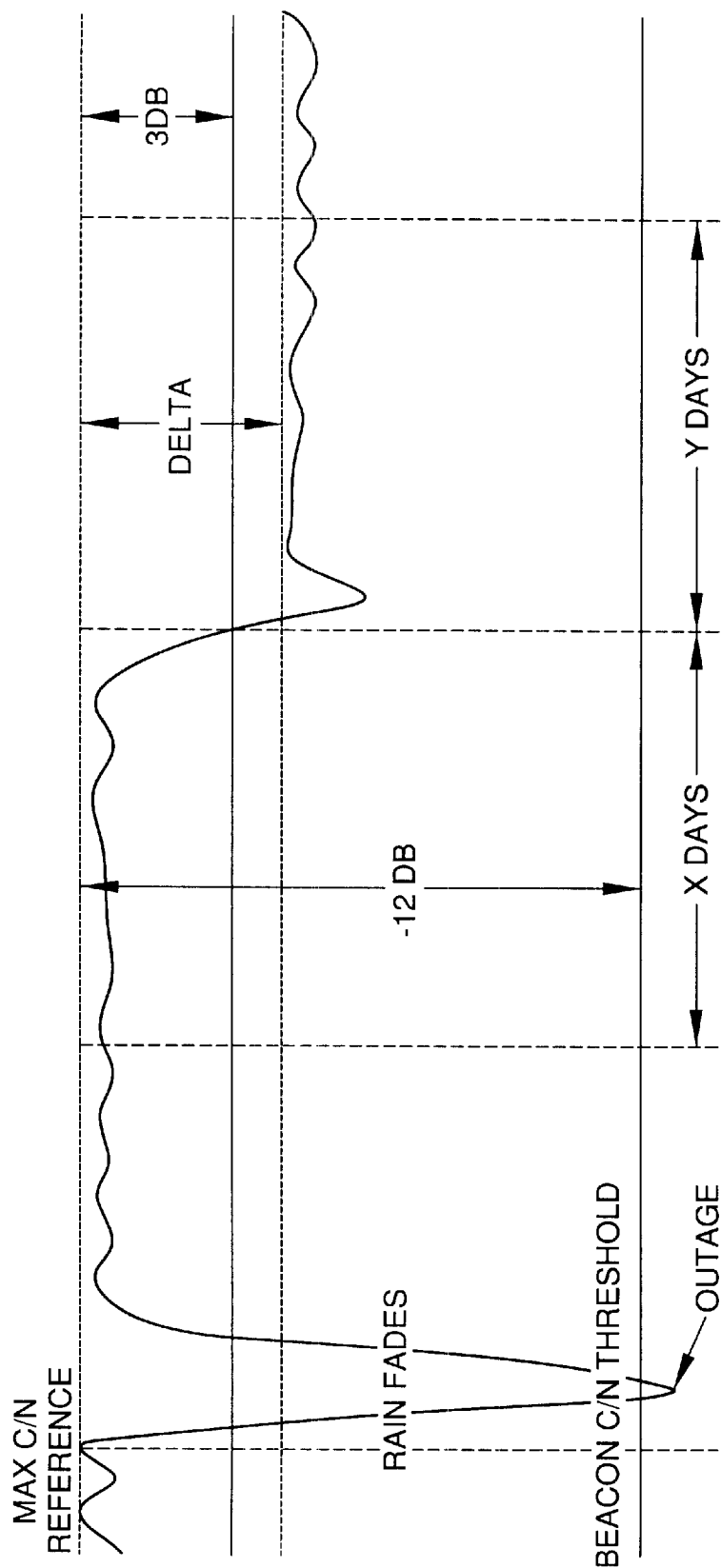
FIG. 9 is a graph depicting the maximum carrier to noise signal in relation to time for detecting short-term event induced antenna mis-pointing.

By extending the method described above for monitoring antenna mis-pointing after installation, one can detect the antenna mispointing due to short term events. The basic concept is to detect the change of the absolute maximum, under clear sky conditions, beacon $(C/N)_b$ before and after an event as illustrated in FIG. 9. Accordingly, after X days the signal has degraded to such an extent that the signal is below the allowable −3 db down from the Max $(C/N)_b$ reference signal.

The method for detecting this short term antenna mis-pointing entails the ST 130 saving the reference Max beacon $(C/N)_b$ contours and their associated satellite position data at about 1 to 2 months time after the ST 130 is initially installed. The ST 130 denotes the absolute maximum value of these max $(C/N)_b$ across all bins as Max C/N(0). Then, the ST 130 measures the average beacon C/N every super frame that the ST 130 receives from the satellite 110. The ST 130 saves the daily max $(C/N)_b$ and its associated satellite position into the corresponding bins of the satellite station keeping box 300. The ST 130 saves the max $(C/N)_b$ values and their associated satellite position data for each bin of the satellite station keeping box 300 for a period of approximately 21 days, for example. The event is assumed to occur on day t, for example, which is unknown to the ST 130. In the absence of polling by the NOCC, the ST 130 computes the (21−t) days average of the daily max $(C/N)_b$ before the event, denoted by Max C/N (−), and the (21−t) days average of the daily max $(C/N)_b$ after the event, denoted by Max C/N (+). Only if Max C/N(+)−Max C/N (−) <−3 dB, or the maximum acceptable link margin, as discussed above, then the ST 130 declares antenna mis-pointing and sends an alarm message to the NOCC.

On the basis of information triggered by news reports, weather data, help desk, and other sources, the NOCC can poll STs in areas effected by such an event for their average daily beacon measurement data before and after a short term event, which is determined by the NOCC. This polling area can be quickly narrowed down to zip code level, since the NOCC has the ST 130 location data upon registration. Thus, the total number of STs 130 to be polled can be reasonably limited, since short term events are generally localized.

Similarly, the methods described for short term and long term event induced antenna mis-pointing can be extended to the conventional VSAT applications. Here, in place of the beacon C/N, the well controlled hub-to-remote carrier C/N is used. Also, the VSAT NOC obtains the satellite position data from the transponder provider and correlates the ST data by using time stamps.

Conventional Very Small Aperture Terminal (VSAT) environments do not have a constant beacon signal and satellite position data readily available as does an embodiment of the present invention. Conventional VSAT systems employ hub-to-remote carrier power that is not constant due to power control for combating uplink rain fade at Ku-band. Also in a conventional VSAT system, even under clear sky conditions, the signal may not be constant due to transponder sharing with other carriers, or is from other system users, as is the case with a partial transponder lease scenario. Nevertheless, these effects can be mitigated by using only long-term averaging of C/N measurements, as is the case with an embodiment of the present invention, along with a relatively stable hub carrier under clear sky conditions. For the conventional bent-pipe satellites using transponders, these transponders can be shared by a number of users. Typically, they are leased on the basis of full, half, quarter, or one-eighth of the transponder in terms of spectrum usage. That is, the transponder is accessed in a frequency division multiple access (FDMA) manner. Each user can use its assigned spectrum with certain allowable maximum power. These users thus share the transponder in an FDMA manner.

An extension of the method described above for monitoring antenna mis-pointing after installation, to the VSAT application for monitoring the initial VSAT antenna pointing after installation is detailed below. Initially, assume that a hub can control its downlink power to within +−0.5 dB at least under clear-sky conditions. Usually, if the transponder is operating near saturation, there should be no problem to achieve such an accuracy. Even for partial transponder lease applications, this accuracy can also be achieved. In a conventional VSAT network, a hub-spoke or star topology is used. VSAT terminals are at the end of the spokes whereas the hub is at the center of the star.

A newly installed VSAT terminal measures its average received hub carrier C/N on an hourly basis, computes and reports to the hub Network Operations Controller (NOC) once or twice daily, the 24-hour or the 12-hour maximum C/N, together with their associated time stamps. Such reporting can be done automatically at a scheduled time or passively upon polling by the NOC. If the time stamp corresponds to the hour when the hub's uplink and hence its downlink is subject to rain fades, the NOC expurgates the received max C/N data from any terminal with a particular time stamp. A rain fade condition is defined as the hub's high power amplifier (HPA) has exceeded 2 dB peak to peak variation within a given hour. The NOC divides the +−0.05 degree satellite station keeping box into N×N bins (eg., N =8) and obtains satellite ephemeris data from the transponder provider. The NOC updates the max C/N for a particular station keeping bin, for each of the bins of the satellite station-keeping box, only if the newly received max C/N for that bin is greater than what was stored previously. Otherwise, the NOC discards this newly received max C/N data. Thus, the maximum C/N data in each bin will have high reliability. That is, the propagation effect on hub carrier is minimal, since good cleat-sky data will eventually occupy the bin. Also, the effect due to transponder sharing with other carriers is reduced through hourly averaging of the C/N measurements.

For a reasonably long period of time, for example 1 to 2 months, there will be sufficient amount of measured clear-sky max C/N data points from the newly installed terminal to supply data for these N×N bins. This is due to the fact that there will be sufficient chance for the satellite to have traversed over these bins many times during this period. Accordingly, a discrete version (N×N) of the terminal uplink beam contour plot would emerge. The peak of these contours would give a good indication about the terminal antenna pointing. By plotting the gradient of the max C/N contours, the amount of antenna mis-pointing can be estimated despite use of a circular or elliptic antenna.

Although only several exemplary embodiments of the present invention have been described in detail above, those skilled in the art will readily appreciate that many modifications are possible in the exemplary embodiments without materially departing from the novel teachings and advantages of this invention. Accordingly, all such modifications are intended to be included within the scope of this invention as defined in the following claims.

What is claimed is:

1. A method for determining pointing of a satellite terminal antenna, wherein said satellite terminal antenna is adapted to receive a signal from at least one satellite within a communications network, identify a satellite position area in which said satellite is expected to be present, and divide said satellite position area into a plurality of regions, said method comprising:

determining a plurality of first measurement values corresponding to a respective one of said regions, each representing a magnitude of a signal received from said satellite by said satellite terminal antenna when said satellite terminal antenna is pointing toward a first location;

determining at least one second measurement value corresponding to a respective one of said regions and representing a magnitude of a second signal received by said satellite terminal antenna from said satellite;

comparing said at least one of said measurement values to said first measurement value corresponding to said region to which said second measurement value corresponds; and issuing an alarm signal when a result of the comparison indicates that said at least one second measurement value differs from said first measurement value by more than a pre-determined amount.

2. A method as claimed in claim 1, wherein said pre-determined amount includes −2 dB.

3. A method as claimed in claim 1, wherein said antenna includes a non-tracking antenna.

4. A method as claimed in claim 1, wherein said first and second measurement values includes a carrier to noise measurement.

5. A method as claimed in claim 1, wherein said first determining step further comprises determining a plurality of said first measurement values after a pre-selected period of time.

6. A method as claimed in claim 5, wherein said pre-selected period of time includes one month after initial installation.

7. A method as claimed in claim 1, wherein said second determining step further comprises determining at least one of said second measurements after a second pre-selected period of time.

8. A method as claimed in claim 7, wherein said second pre-selected period of time includes one year.

9. A method as claimed in claim 1, wherein said first determining step is determined over a period of 21 days.

10. A method as claimed in claim 1, wherein said method further comprises:

determining said second measurement value before and after a short term event;

averaging said second measurement value before said short term event;

averaging said second measurement value after said short term event;

determining an absolute value of the result of said first and second said averaging steps;

comparing said first and second said absolute values; and issuing an alarm when a result of the comparison indicates at least one of said second absolute value differs from said first absolute value by a pre-determined amount.

11. A method as claimed in claim 10, wherein said method further comprises:

polling said satellite terminal antenna by a network control center upon occurrence of a short term event.

12. A method as claimed in claim 11, wherein said short-term event comprises a hurricane, a tornado, an earthquake and a micro-burst.

13. An apparatus for determining pointing of a satellite terminal antenna, wherein said satellite terminal antenna is adapted to receive a signal from at least one satellite within a communications network, identify a satellite position area in which said satellite is expected to be present, and divide said satellite position area into a plurality of regions, said apparatus comprising:

a satellite terminal antenna;

a processing device, adapted to process a plurality of first measurement values corresponding to a respective one of said regions, each representing a magnitude of a signal received from said satellite by said satellite terminal antenna when said satellite terminal antenna is pointing toward a first location and at least one second measurement value corresponding to a respective one of said regions and representing a magnitude of a second signal received by said satellite terminal antenna from said satellite, said processing device compares said at least one of said measurement values to said first measurement value corresponding to said region to which said second measurement value corresponds; and an alarm signal when a result of the comparison indicates that said at least one second measurement value differs from said first measurement value by more than a pre-determined amount.

14. A method as claimed in claimed in claim 13, wherein said satellite terminal antenna includes a non-tracking antenna.

15. A method as claimed in claim 13, wherein said pre-determined amount includes −2 dB.

16. A computer readable medium for determining pointing of an satellite terminal antenna, wherein said satellite terminal antenna is adapted to receive a signal from at least one satellite within a communications network, identify a satellite position area in which said satellite is expected to be present, and divide said satellite position area into a plurality of regions, said computer readable medium comprising the following set of instructions:

a first set of instructions for determining a plurality of first measurement values corresponding to a respective one of said regions, each representing a magnitude of a signal received from said satellite by said satellite terminal antenna when said satellite terminal antenna is pointing toward a first location;

a second set of instructions for determining at least one second measurement value corresponding to a respective one of said regions and representing a magnitude of a second signal received by said satellite terminal antenna from said satellite;

a third set of instructions for comparing said at least one of said measurement values to said first measurement value corresponding to said region to which said second measurement value corresponds; and a fourth set of instructions for issuing an alarm signal when a result of the comparison indicates that said at least one second measurement value differs from said first measurement value by more than a pre-determined amount.

17. A computer readable medium as claimed in claim 16, wherein said satellite terminal antenna is a non-tracking antenna.

18. A computer readable medium as claimed in claim 16, wherein said pre-determined amount includes −2 dB.

* * * * *